April 6, 1926.

W. T. BIDWELL 1,579,634

APPARATUS FOR MOLDING SEPTIC TANKS

Filed July 11, 1924   3 Sheets-Sheet 1

Inventor
W T Bidwell

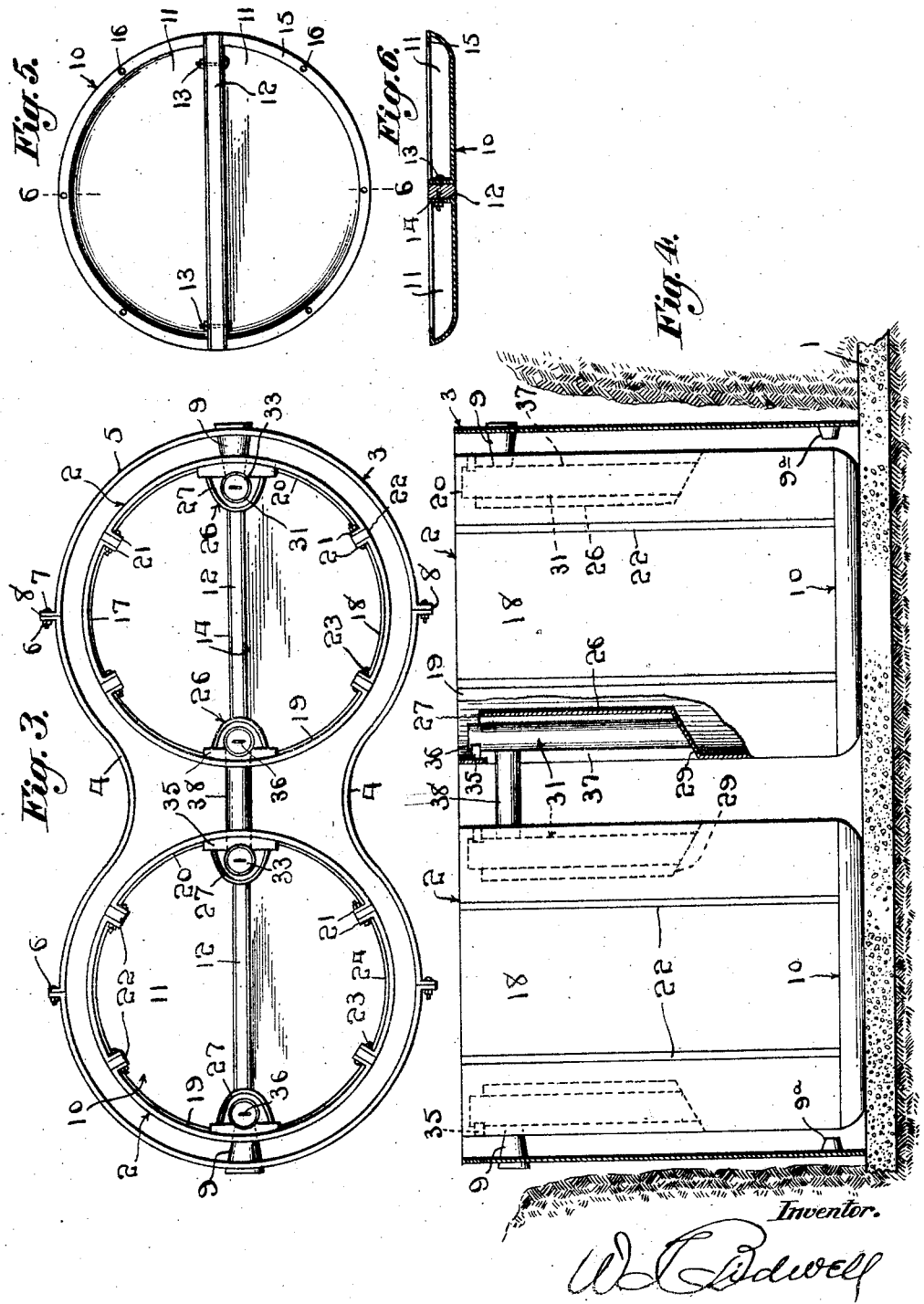

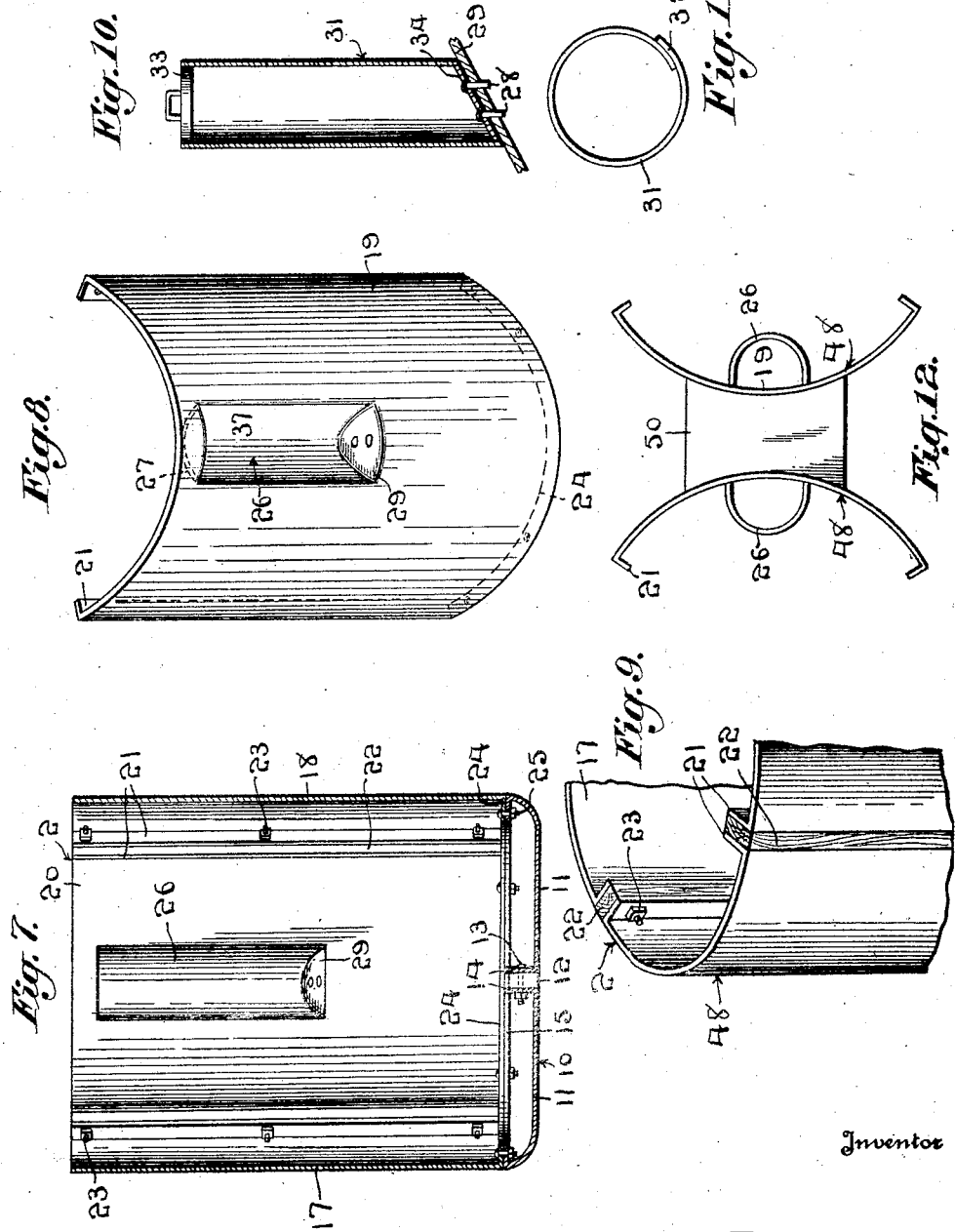

Patented Apr. 6, 1926.

1,579,634

UNITED STATES PATENT OFFICE.

WILLIAM T. BIDWELL, OF MIAMI, FLORIDA.

APPARATUS FOR MOLDING SEPTIC TANKS.

Application filed July 11, 1924. Serial No. 725,462.

*To all whom it may concern:*

Be it known that I, WILLIAM T. BIDWELL, a citizen of the United States, residing at Miami, in the county of Dade and State of Florida, have invented new and useful Improvements in Apparatus for Molding Septic Tanks; and I do hereby declare the following is a full, clear, and exact description of the invention, such as will enable others skilled in the art to which it appertains to make and use the same.

This invention relates to improvements in septic tank molds and to a method of molding such tanks.

The primary object of the invention is to provide a method whereby a tank of any desired length and capacity may be molded by the use of sectional forms, all of the outer forms being substantially the same with the exception of the outer end forms. The end forms are so shaped that they may be connected to the side forms to provide a number of tank units communicating by suitable ports.

Another object is to furnish molding elements which may be employed in molding a tank of any desired size and capacity at the place of use, so that it is unnecessary to transport the tank and assemble the same after its elements are manufactured.

Another object of the invention is to provide an inner tank form consisting of detachably connected sections, which may be withdrawn from the interior of the tank, after the latter has been molded.

A further object is to provide novel means for forming baffles within a concrete tank while molding the latter, said means including removable cores designed to provide vertical passageways within the baffles.

With the foregoing objects outlined and with other objects in view which will appear as the description proceeds, the invention consists in the novel features and steps hereinafter described in detail, illustrated in the accompanying drawings, and more particularly pointed out in the appended claims.

Referring to the drawings,

Fig. 3 is a top plan view of certain of the molding elements, which I have invented, said molding elements being assembled to form a two-cell tank.

Fig. 4 is a side view partly in section, of the same.

Fig. 5 is a top plan view of the bottom of one of the inner forms.

Fig. 6 is a diametrical sectional view of the latter taken on line 6—6 of Fig. 5.

Fig. 7 is a vertical diametrical section of one of the inner forms.

Fig. 8 is a perspective view of one section of one of the inner forms.

Fig. 9 is a perpsective view of a portion of the upper end of one of the inner forms.

Fig. 10 is a vertical sectional view of one of the baffle cores forming part of the invention.

Fig. 11 is an enlarged top plan view of one of the core casings.

Fig. 12 is a plan view of adjacent sections of the inner forms, illustrating the manner in which a block is placed between the same to form a large passageway between adjacent cells of the tank.

Figure 1:
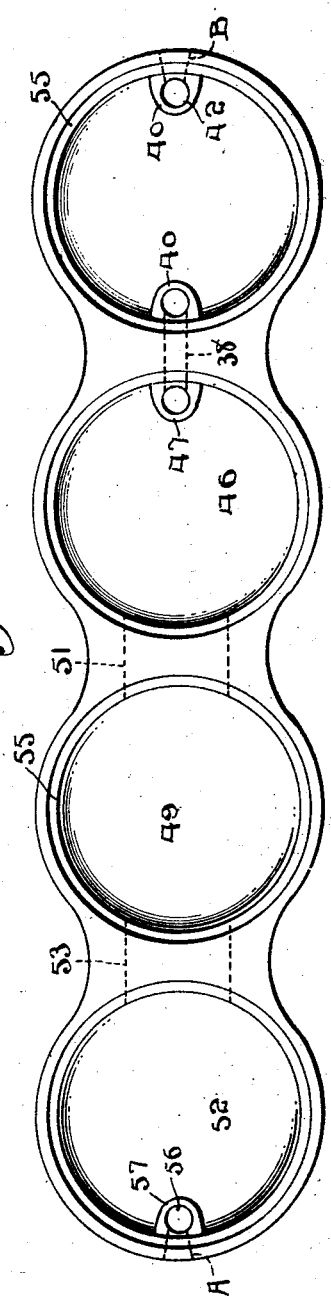
Fig. 1 is a top plan view of a four-cell tank manufactured in accordance with my invention.

In applying the present invention, a hole is dug in the ground at the place where the tank is to be located, and then a mat 1 of concrete is poured on the bottom of this hole to form a masonry flooring. After this flooring has set for a sufficient time, I place a number of inner forms 2, and outer forms 3 in the hole and on the mat 1 to mold a concrete tank having the desired number of cells. To illustrate this, attention is directed to Figs. 3 and 4, in which 4 designates the outer side forms, and 5 designates the outer end forms. Each of these forms is preferably made of sheet metal, and each side form is of concave or channel shape in plan with its ends bent outwardly to provide end flanges 6 having apertures to receive suitable fastening means, such as bolts 7. Each end form is of semi-cylindrical shape and has apertured end flanges 8 to receive the bolts 7. It will, therefore, be seen that if a two-cell tank is to be formed, I make this outer mold box of four sections, detachably connected together by the bolts 7, and substantially 8-shaped in plan. As shown in Fig. 4, the lower edge of this outer form is placed on the mat 1. At this point attention is called to the fact that the outer form may be made of any length to accommodate the desired number of cells, by simply arranging a sufficient number of the side forms 4 end to end to make up a form of the desired length. For instance, we will assume that it is desired to mold a three-cell tank instead of a two-cell one. Under such circumstances two of the side forms 4 will be arranged at each side and be placed end to end, so that bolts 7 may be employed to secure the same together. Then two end forms 5 are secured to the ends of the joined side forms.

Reverting now to Figs. 3 and 4, it may be stated that each end form has an upper inwardly extending frustro-conical plug 9 which projects into the inner adjacent form 2. Each end form also has a lower plug $9^a$. Each inner form, for a two-cell tank consists of a substantially semi-spherical bottom 10 made up in two halves 11 separated by a diametrical spacer 12 which is secured in position by bolts 13. These halves are also preferably formed of sheet metal and have vertical flanges 14 to receive the bolts 13, and horizontal flanges 15 provided with apertures 16, for a purpose hereinafter described. The body portion of the inner form is of cylindrical shape and consists of sections 17, 18, 19 and 20. Each of these sections forms a segment of a circle and is provided at its side edges with radially disposed apertured flanges 21 which bear against vertical spacers 22 held in place by bolts 23. As best shown in Fig. 7, each of these sections also has a horizontal flange 24 at its lower end provided with apertures to receive bolts 25 which also pass through the apertures 16 in the flanges 15 in the bottom. From this it may be seen that the entire inner form is of sectional construction, so that it may be removed piece by piece after the tank is molded.

Each of the sections 19 and 20 are provided with an inwardly extending convex portion 26, having an open upper end 27 and an inclined bottom 29. The portion 26 receives a collapsible core 31, one of which is shown in detail in Figs. 10 and 11. The core consists of a piece of sheet metal rolled upon itself, to overlap its ends 32, and an upper plug 33 and a lower plate 34 are arranged in this casing to hold the same in cylindrical shape. The plug 34 rests on the inclined bottom 29 and is detachably secured in position by dowel pins 28, which pass through 34 and 29. When the core is assembled, as shown in Fig. 10, it bears against a block 35, which rests on the upper end of the portion 26 and abuts against the inner surface of the inner form 2. We will now assume that two of the inner forms 2 have been placed in the outer forms as shown in Figs. 3 and 4. At this time the plugs 9 will project into the cavities 37 at the opposite ends of the pair of inner forms and bear against the cores 31 in these cavities and the plugs $9^a$ will occupy the positions shown in Fig. 4. At this time a section of hollow tile 38 is inserted between the two inner forms and is supported in any suitable manner, in the position shown in Fig. 4. We will, therefore, see that the inner forms are spaced from the outer forms by an 8-shaped chamber, and this chamber is filled with concrete to form the body of the tank. After the concrete has set for a sufficient length of time to permit the concrete to harden, the blocks 35 are removed; then dowels 28 are knocked upward clear of 29; then the bolts 23 are detached and parts 22, 17, 18, 19 and 20 are removed. Core 31 may now be removed by withdrawing plug 33; knocking 34 out of the lower end of core, and then contracting 31 and lifting it out of the baffle formed by the concrete.

The removal of sections 19 and 20 is facititated by the slanting bottoms 29 of the cavity portions 26; the slanting bottom permitting the sections to be readily drawn away from the baffles 40 (Fig. 1) which they have aided in molding.

Figure 2:
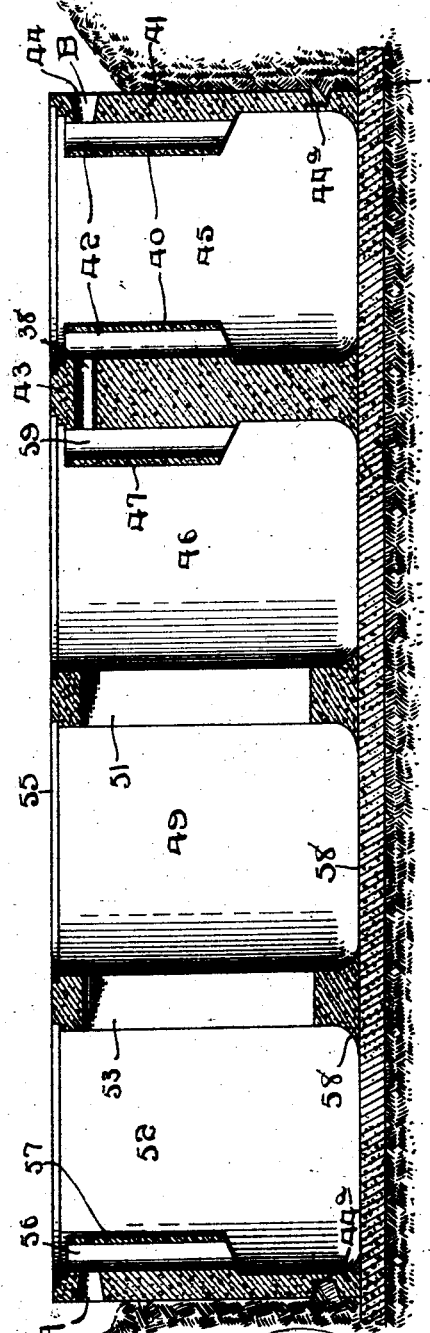
Fig. 2 is a longitudinal vertical sectional view of the same.

By referring to Figs. 1 and 2, it will be seen that the concrete which is poured into the space between the inner and outer forms, also flows into the cavities 37 and around the cores 31 to form the baffles 40 which are integral with the end walls 41 of the tank, and that the cores have formed the vertical conduits 42.

After the sections 19 and 20 are removed, the bolts 13 may be withdrawn and then the spacer 12 can be removed and subsequently the halves 11 of the bottom may be taken out. Now, the pipe 38 remains embedded in the concrete in the partition wall 43, as shown in Figs. 1 and 2, and then the forms 4 and 5 may be taken off of the outside of the molded tank, after the bolts 7 are removed. When the end forms 5 are withdrawn, the plugs 9 and $9^a$ move with them and leave apertures 44 and cavities $44^a$ in the ends of the tank.

The example just given discloses the molding of a two-cell tank, while the tank shown in Figs. 1 and 2 is of four-cell construction. The molding of this four-cell tank is quite similar to that of the two-cell tank with the exception that three side forms 4 are arranged at each side and are connected to two of the end forms 5. Then one inner form exactly the same as that shown in Figs. 3 and 4, is placed at the right hand end, to form the chamber 45. The inner form for the next chamber 45 is now inserted in the outer form and a pipe 38 is placed between the two inner forms. Then a third form is inserted to provide the cell 49 and the second and third inner forms are spaced apart by a hollow wood block 50, which closes the opposite cavities 37 in the second and third inner forms. Now these two cavities 37 are filled with sand, and when the concrete is poured the block 50 provides the large port 51. To provide the next cell 52, a fourth inner form is used and another spacing block 50 is arranged between the inner forms in the cells 49 and 52 to provide the large port 53. After the inner forms have been removed, the blocks 50 can be sawed through and knocked out and thus the ports 51 and 53 will be provided.

After the tank shown in Figs. 1 and 2 is completed, the aperture A forms the inlet of the tank and the aperture B the outlet, and if desired the bottoms of cavities 44ª may be punched out to provide ports. These ports will facilitate the washing out of the tank. Furthermore, during manufacture, each inner form 2 may have a bead at its upper edge to provide a countersunk seat 55 at the upper end of each cell to accommodate a cover plate.

When the tank shown in Figs. 1 and 2 is in use, the incoming material will flow in at A and must move downwardly in the passageway 56 owing to the baffle 57. Then the material from the cell 52 may flow from the latter into the cells 49 and 46, this movement being facilitated by the semi-sperical bottoms 58 of the cells. Now the material in the cell 46 must flow upwardly in the baffle 47 through the passageway 59 in order to enter the pipe 38, and from the pipe 38 the purified water will flow through the baffles in cell 45 and be discharged through a suitable pipe connected to the outlet port B.

While I have disclosed the preferred embodiment of the invention and the most desirable method of application, I am aware that various changes may be made in the details set forth without departing from the spirit of the invention as expressed in the claims.

What I claim and desire to secure by Letters Patent is:—

1. Means for producing masonry tanks including a substantially cylindrical inner form provided at its lower end with a detachable bottom consisting of a substantially semi-spherical body made up of a plurality of sections and a spacer, and means for detachably connecting the sections and spacer.

2. A mold unit comprising a substantially semi-spherical body including a plurality of sections and a spacer arranged between the same, each of said sections being formed of metal and provided at its upper edge with a substantially semi-circular apertured flange, each section also having an upwardly extending flange provided with apertures to receive means for securing the sections to the spacer.

3. A form for concrete molding including a cylindrical body formed of detachably connected sections, and a substantially semi-spherical bottom detachably connected to said body.

4. A form for concrete molding including a cylindrical body portion formed of segmental sections each provided at its side edges with flanges, spacers arranged between said flanges, and means detachably connecting the flanges and spacers.

5. A form for concrete molding including a cylindrical body and a substantially semi-spherical bottom detachably connected to the body, said body consisting of a plurality of segmental sections, each provided at its side edges with inwardly extending flanges, spacers arranged between the flanges, means detachably connecting the flanges and spacers, and flanges at the lower edges of the sections resting on said bottom and detachably secured to the latter.

6. A form for concrete molding including a body provided with an inwardly extending cavity having an open top and a bottom, and a core extending through the open top and resting on said bottom.

7. A form for concrete molding including a body having an inwardly extending cavity provided with an open top and an inclined bottom, a plate resting on said bottom, means detachably connecting the plate to the bottom, and a removable core resting on the bottom and centered in the cavity by said plate.

8. An outer form for concrete molding including side members substantially channel-shaped in plan, substantially semi-circular end members, and means connecting the ends of said members together.

9. An outer form for concrete molding including a plurality of side members, each of substantially channel-shape in top plan and provided at its ends with flanges, substantially semi-circular end members having end flanges, and means detachably connecting the flanges of the side members to the flanges of the end members.

10. An outer form for concrete molding including oppositely disposed sheet metal side members having their intermediate portions bent inwardly toward one another to provide a reduced space between said members, substantially semi-circular sheet metal end members, and means detachably connecting the ends of the side members to the ends of the end members.

In testimony whereof I affix my signature.

WILLIAM T. BIDWELL.